United States Patent
Niranjan et al.

(10) Patent No.: US 8,270,415 B2
(45) Date of Patent: Sep. 18, 2012

(54) APPARATUS AND METHOD FOR ROUTING DATA IN A WIRELESS NETWORK USING BLUETOOTH

(75) Inventors: Niranjan Niranjan, Richardson, TX (US); Mohan Reddy Duggi, Garland, TX (US); Thendral Arasu, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 681 days.

(21) Appl. No.: 12/428,327

(22) Filed: Apr. 22, 2009

(65) Prior Publication Data

US 2010/0272082 A1 Oct. 28, 2010

(51) Int. Cl.
*H04L 12/28* (2006.01)
(52) U.S. Cl. .......................... 370/400; 370/328; 370/338
(58) Field of Classification Search .................. 370/238, 370/315, 328, 338, 400, 465, 492; 375/132; 379/114.28, 114.01
See application file for complete search history.

(56) References Cited

U.S. PATENT DOCUMENTS

| | | | |
|---|---|---|---|
| 6,275,500 B1* | 8/2001 | Callaway et al. | 370/449 |
| 2001/0041594 A1* | 11/2001 | Arazi et al. | 455/561 |
| 2002/0044549 A1 | 4/2002 | Johansson et al. | |
| 2002/0075940 A1* | 6/2002 | Haartsen | 375/132 |
| 2004/0203359 A1 | 10/2004 | Sasai et al. | |
| 2005/0276402 A1* | 12/2005 | Tang et al. | 379/114.28 |
| 2007/0008922 A1* | 1/2007 | Abhishek et al. | 370/329 |
| 2007/0280137 A1 | 12/2007 | Bahr et al. | |
| 2008/0112325 A1* | 5/2008 | Sivakumar et al. | 370/238 |

FOREIGN PATENT DOCUMENTS

| EP | 1 919 166 A2 | 5/2008 |
|---|---|---|
| WO | WO 02/25879 A1 | 3/2002 |

OTHER PUBLICATIONS

European Search Report dated Aug. 4, 2010 in connection with European Patent Application No. EP 09 179 415.6.

* cited by examiner

*Primary Examiner* — Andrew Lai

(57) ABSTRACT

Systems and methods are disclosed for use in a wireless network that includes a first device using an wireless association protocol. In some embodiments the wireless association protocol uses at least one inquiry packet and a scatternet topology. These systems promote communication with other devices using the wireless association protocol through a routing protocol. This routing protocol routes data according to a network topology created through information obtained through the wireless association protocol.

20 Claims, 3 Drawing Sheets

APPARATUS AND METHOD FOR ROUTING DATA IN A WIRELESS NETWORK USING BLUETOOTH

TECHNICAL FIELD OF THE INVENTION

The present application relates generally to data routing and, more specifically, to a system and method for routing data through connection orientated protocols.

BACKGROUND OF THE INVENTION

Short range protocols that operate using a physical channel allow for the point to point communication links between nodes. For example, Bluetooth (a short range protocol that operates using a physical channel) allows for communication between nodes in the 2.4 GHz spectrum. Within the physical channel, a physical link is formed between any two devices that transmit packets in either direction between them. In a piconet physical channel there are restrictions on which devices may form a physical link. There is a physical link between each slave and the master. Physical links are not formed directly between the slaves in a piconet. Therefore, in order for slaves to communicate in the piconet, indirect routing of data is needed.

Indirect communication between nodes that use a short range protocol that operates using a physical channel is difficult. There is not a way to exchange information directly between nodes that do not have a physical link. In addition, connection oriented protocol may limit the number of concurrent connections permitted by any node, so that only a certain number of devices may have a physical link at any given time.

Therefore, there is a need in the art for an improved routing for devices that use connection oriented protocols. In particular, there is a need for a protocol that is capable of routing data over connection oriented protocols.

SUMMARY OF THE INVENTION

In one embodiment, systems and methods are disclosed for use in a wireless network that include a first device using an wireless association protocol, a second device using the wireless association protocol within the wireless range of the first device, and a third device using the wireless association protocol within the range of the second device. In this system, the first device communicates with the third device through the second device using an device association protocol.

In another embodiment, a system of network communications is disclosed that comprises a first node, a second node in communication with the first node, and a third node in communication with the second node. The first, second, and third node use inquiry packets to exchange information relating to the nodes currently within the range of each node, and wherein the first node creates a network topology of the connections the second node currently has.

In yet another embodiment, a method of using a scatternet protocol to establish direct routing is disclosed that includes determining that the number of hops between a first node and a second node exceeds a predetermined threshold, determining the active connection currently maintained by the first node that has the least activity, disconnecting the active connection between the first node and the node that has the least activity; and creating a direct connection between the first node and the second node.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
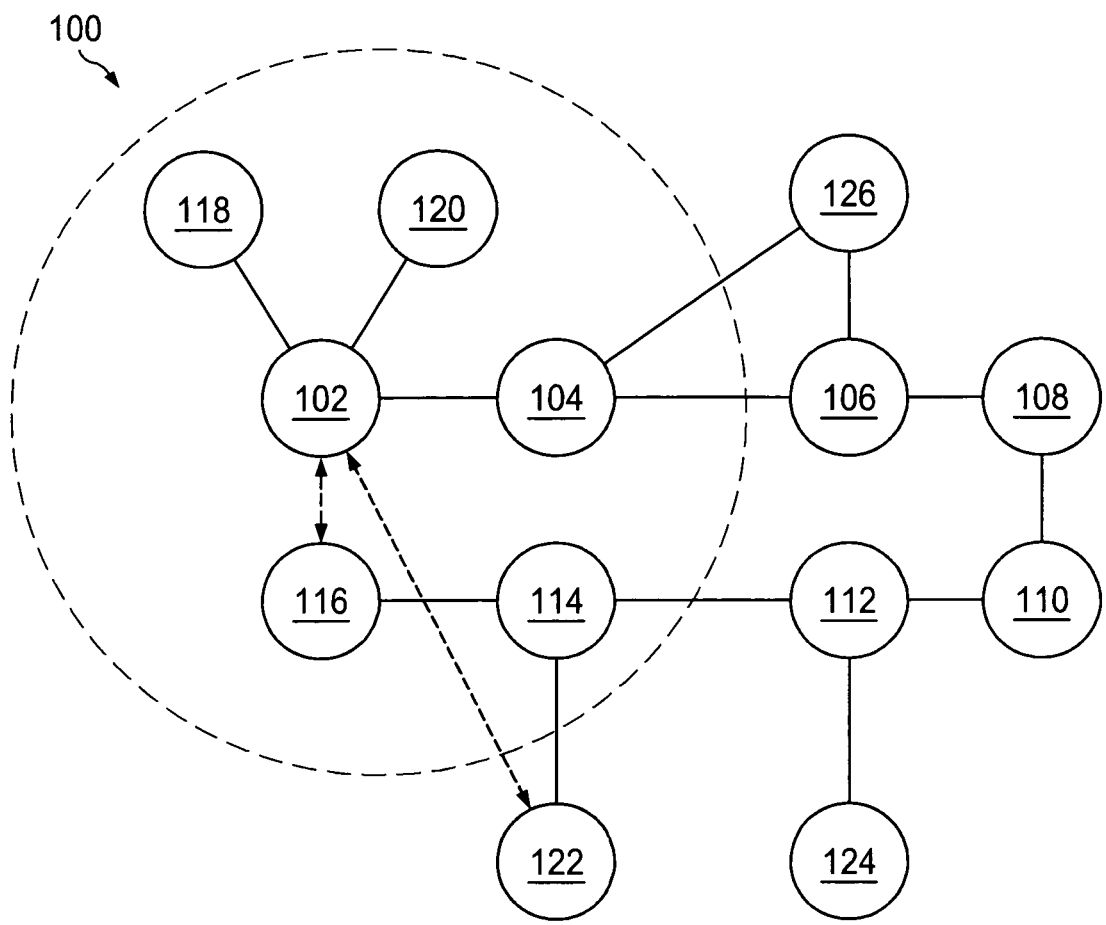
FIG. 1 illustrates a network topology with a plurality of nodes according to an exemplary embodiment of the disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A piconet is the type of connection that is formed between two or more Bluetooth-enabled devices such as modern cell phones or PDA's. All Bluetooth enabled devices are "peer units" in that they have identical implementations. However, when a piconet is formed between two or more devices, one device is dynamically elected to take the role of 'master', and all other devices assume a 'slave' role for synchronization reasons. Piconets have a 3-bit address space, which limits the maximum size of a piconet to 8 devices ($2^3=8$) (i.e., 1 master and 7 slaves).

A scatternet is a number of interconnected piconets that supports communication between more than 8 devices. Scatternets can be formed when a member of one piconet (either the master or one of the slaves) elects to participate as a slave in a second, separate piconet. The device participating in both piconets can relay data between members of both ad-hoc networks. Using this approach, it is possible to join together numerous piconets into a large scatternet, and to expand the physical size of the network beyond Bluetooth's limited range. Bluetooth is sometimes referred to as a "wireless association protocol" given it's reliance on a physical layer connection between devices in order to maintain communication.

One of the innovative elements of the present disclosure is the use of inquiry packets and the scatternet protocol packets in order to create a network topology that may be used by a routing protocol. In one embodiment, inquiry packets are used to discover neighboring nodes. Also in this embodiment, the scatternet protocol is used to exchange information between neighboring nodes that comprises network topology information. This network topology information includes information related to the inquiry packets received by each node. Using both the inquiry packets and the scatternet topology, a routing protocol may be implemented that optimizes the data paths between nodes within a wireless network.

For example, using the Bluetooth standard, inquiry packets are used by a first Bluetooth device with a Bluetooth stack in order to identify other Bluetooth devices within the range of the first Bluetooth device. The first Bluetooth device may exchange information with the Bluetooth devices identified through the inquiry packets using the scatternet protocol. This exchanged information between the first Bluetooth device and other Bluetooth devices includes information relating to inquiry packets received by each Bluetooth device. The first Bluetooth device may create a network topology based upon information obtained from the other Bluetooth devices as well as the inquiry packets received by the first Bluetooth device. This network topology is further optimized by the routing protocol with the help of inquiry packets and traffic information between any two nodes in the network topology.

While the previous example relates to Bluetooth devices, it is explicitly understood that any routing protocol that routes data using discovery packets combined with an exchange of the discovery packets with nodes in direct communication with other nodes is explicitly contemplated by this disclosure.

FIG. 1 illustrates a network topology 100 with a plurality of nodes 102-126 capable of wireless communication, with the range of the piconet of node 102 being depicted as wireless communication range 130. Therefore, nodes 104, 114, 116, 118, and 120 are within the range of node 102.

In the example shown in FIG. 1, the degree of the topology is set to be 3. Node 102 and Node 116 are physically 1-hop separated but they are communicating over 7 hops path. Another example is the communication between Node 102 and Node 112 which are physically 2-hops separated but they are also communicating over 7 hops path. The extended paths may be a result of the limited physical layer connections that node 102 is capable of maintaining, or of the range of node 102.

In order to overcome this problem, a unique system and method is disclosed for providing inquiry packets used for routing path optimization. The inquiry packets are part of Bluetooth protocol. In the presently disclosed systems and methods, inquiry packets serve at least two purposes:
1) Used by scatternet protocol for device discovery.
2) Used by routing protocol to maintain a list of neighboring devices.

Routing protocol uses this neighbor list to do route path optimization after route discovery is done. For example, in FIG. 1, Node 102 is communicating with Node 116. Table 1 shows the corresponding routing for Node 102 and Table 2 shows the neighbor table at Node 102 based on topology shown in FIG. 1. "Traffic Type" measures the duration of data flow between any source and destination. Examples of traffic type include "msg" (short, discrete transfer) and "data session" (long continuous transfer). "Traffic history" measures the activity of a node with neighboring nodes which can be 1 hop or multi-hop.

TABLE 1

Routing Table at Node 102

| Destination | Routing Path | Traffic Type | Hops |
| --- | --- | --- | --- |
| 116 | 102 -> 104 -> 106 -> 108 -> 110 -> 112 -> 114 -> 122 | Msg | 7 |

TABLE 2

Neighbor Table at Node 102 (Max Degree = 3)

| Neighbor Node | Connection | Current Routing Table Entry | Traffic History (5-Active, 1-Inactive) |
| --- | --- | --- | --- |
| 104 | Yes | Yes | 5 |
| 114 | No | No | 1 |
| 120 | Yes | No | 3 |
| 116 | No | No | 2 |
| 118 | Yes | No | 2 |

Node 102 discovers the route to Node 116 after the initial route discovery purpose. After that it matches the intermediate node with its neighbor table and found that Node 116 is a physical neighbor. But the traffic type is "msg" and the traffic history to or through 116 is low (traffic history=2). So, it doesn't perform any routing path optimization and it updates the traffic history with node 116. If traffic history to or through 116 would have been more than 3, or been of the type data session, then the direct connection will be made to node 116 using following steps:

if (Degree (102)<Max_Degree) or data type=data session
then
Send event to Scatternet Protocol to make direct connection with K
else
Find connected neighbor node X with least traffic history.
Send event to Scatternet Protocol to disconnect Node X
Send event to Scatternet Protocol to make direct connection with 116.

In this example, Node 102 will disconnect with neighbor node 118 and make a direct connection with node 116.

Figure 2:
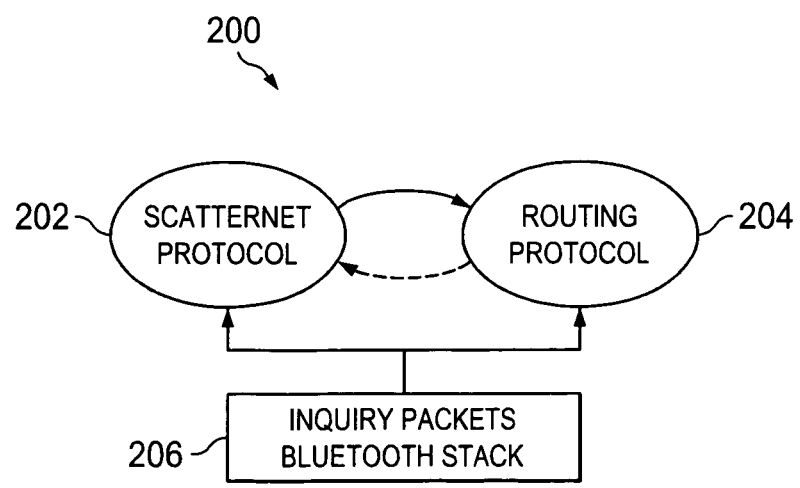
FIG. 2 illustrates a overview of the according to an exemplary embodiment of the disclosure.

FIG. 2 is an overview 200 of the link of the inquiry packets within the Bluetooth stack 206 to the scatternet protocol 202 and routing protocol 204. The inquiry packets found within the Bluetooth stack 206 are used within the scatternet protocol 202 (device discovery) and routing protocol 204 (list of neighbors). The routing protocol, as discussed herein, is used in conjunction with the scatternet protocol in order to route data traffic throughout the network.

Figure 3:
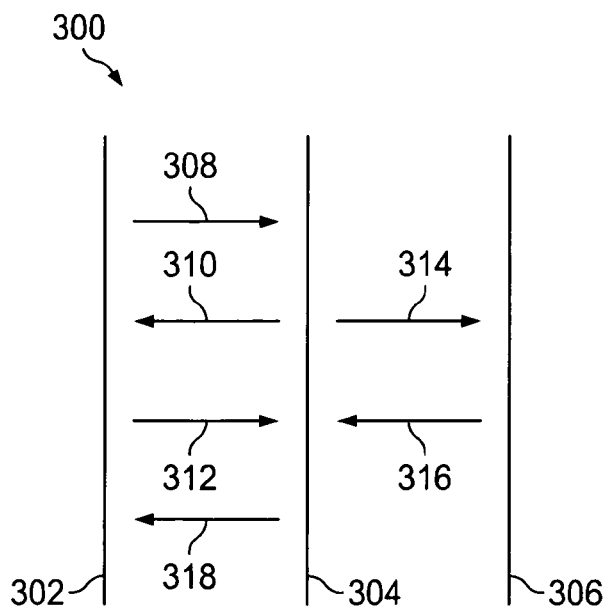
FIG. 3 illustrates a network flowchart according to an exemplary embodiment of the disclosure.

FIG. 3 is a flow diagram 300 showing interaction between a first node 302, second node 304, and a third node 306. The first node 302 communicates with the second node, shown by communication line 308. Second node 304 responds to the first node 302 through communication 310. Communication 310 may comprise routing information, including that second node 304 is in communication with third node 306. When first node 302 wishes to communicate with third node 306, first node 302 transmits data to the second node 304 through communication 312. Second node 304 forwards the communication 312 through communication 314 to the third node 306. The third node 306 responds to the second node 304 through communication 316. Second node 304 forwards the communication 316 through communication 318 to the first node 302. In this way, indirect communication is possible through a plurality of nodes.

Figure 4:
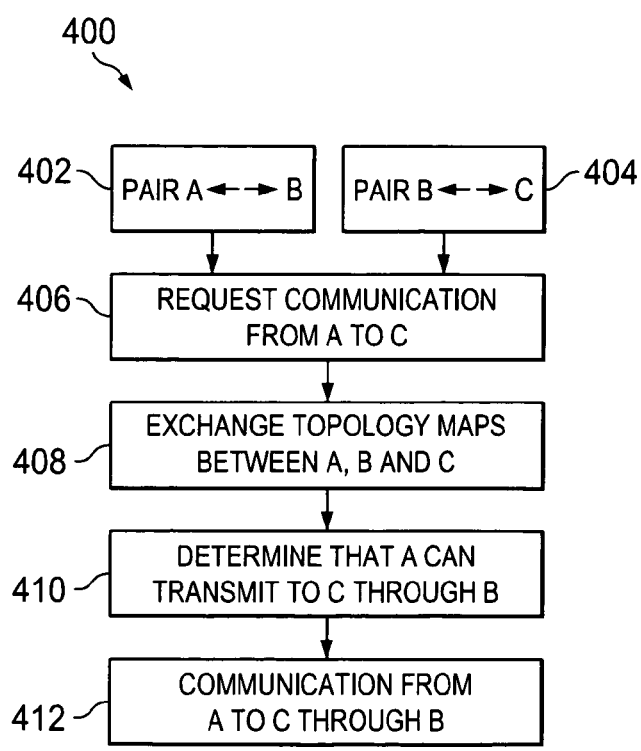
FIG. 4 is a flow diagram illustrating communication links according to an exemplary embodiment of the disclosure.

FIG. 4 is a flowchart 400 of the use of the routing of the present disclosure. In block 402, nodes A and B are paired. In block 404, nodes B and C are paired. In block 406, there is a request for communication from node A to node C. In block 408, there is an exchange of topology maps between nodes A, B, and C. In block 410, node A determines that it can communicate to node C through node B. In block 412, node A communicates with Node C through node B.

Figure 5:
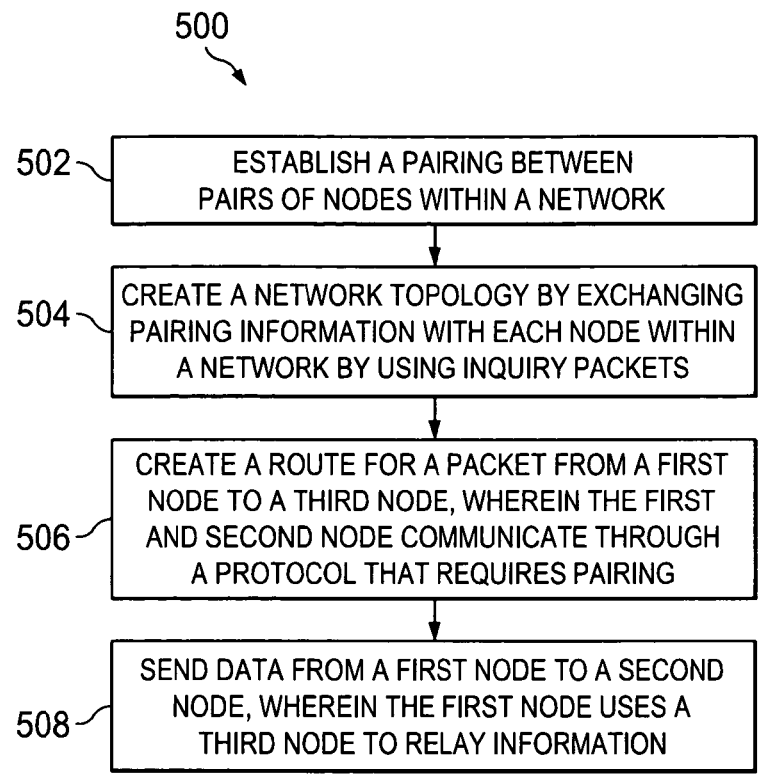
FIG. 5 is a flowchart is a flowchart illustrating a method of routing traffic through connection oriented devices.

FIG. 5 is a flowchart 500 of one method of establishing communication between nodes within a network. In block 502, there is a paring established between a pairs of nodes within a network. In block 504, the network topology by exchanging pairing information with each node within a network using inquiry packets. In block 506, a route for a packet is created from a first node to a third node, wherein the first and second node and communicate through a protocol that requires paring. In block 508, data is sent from a first node to a second node, wherein the first node uses a third node to relay information.

Although the present disclosure has been described with an exemplary embodiment, various changes and modifications may be suggested to one skilled in the art. It is intended that the present disclosure encompass such changes and modifications as fall within the scope of the appended claims.

Figure 6:
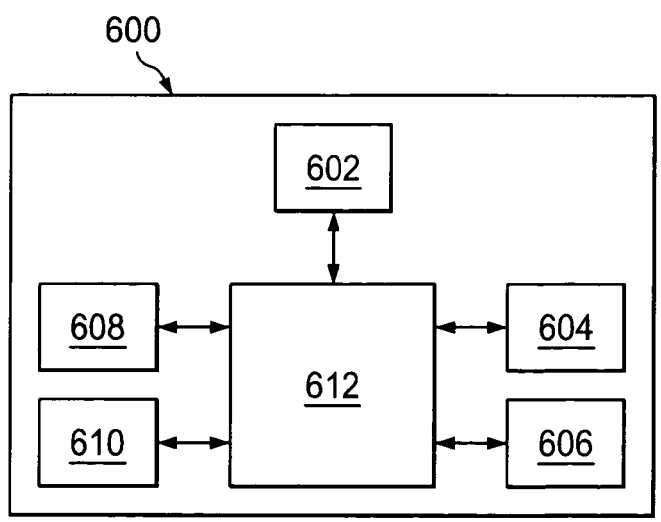
FIG. 6 is a block diagram of an exemplary general-purpose computer system suitable for implementing the several embodiments including the controller of the node used in this disclosure.

Any element of the disclosed system, including node 102, described above may be implemented on any general-purpose computer 600 with sufficient processing power, memory resources, and network throughput capability to handle the necessary workload placed upon it. FIG. 6 illustrates a typical, general-purpose computer system suitable for implementing one or more embodiments disclosed herein. The general-purpose computer 600 includes a processor 612 (which may be referred to as a central processor unit or CPU) that is in communication with memory devices including secondary storage 602, read only memory (ROM) 604, random access memory (RAM) 606, input/output (I/O) 608 devices, and network connectivity devices 610. The processor may be implemented as one or more CPU chips.

The secondary storage 602 is typically comprised of one or more disk drives or tape drives and is used for non-volatile storage of data and as an over-flow data storage device if RAM 606 is not large enough to hold all working data. Secondary storage 602 may be used to store programs that are loaded into RAM 606 when such programs are selected for execution. The ROM 604 is used to store instructions and perhaps data that are read during program execution. ROM 604 is a non-volatile memory device that typically has a small memory capacity relative to the larger memory capacity of secondary storage. The RAM 606 is used to store volatile data and perhaps to store instructions. Access to both ROM 604 and RAM 606 is typically faster than to secondary storage 602.

I/O 608 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 610 may enable the processor 612 to communicate with an Internet or one or more intranets. With such a network connection, it is contemplated that the processor 612 might receive information from the network, or might output information to the network in the course of performing the above-described method steps. Such information, which is often represented as a sequence of instructions to be executed using processor 612, may be received from and outputted to the network, for example, in the form of a computer data signal embodied in a carrier wave.

Such information, which may include data or instructions to be executed using processor 612 for example, may be received from and outputted to the network, for example, in the form of a computer data baseband signal or signal embodied in a carrier wave. The baseband signal or signal embodied in the carrier wave generated by the network connectivity devices 610 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 612 executes instructions, codes, computer programs, scripts that it accesses from hard disk, floppy disk, optical disk (these various disk based systems may all be considered secondary storage 602), ROM 604, RAM 606, or the network connectivity devices 610.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In some embodiments, some or all of the functions or processes of the one or more of the devices are implemented or supported by a computer program that is formed from computer readable program code and that is embodied or encoded in a computer readable medium or in a computer readable device or memory. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for communication in a Bluetooth wireless network using a connection oriented protocol, the system comprising:
   a first device configured to:
      use a wireless association protocol that uses a scatternet topology and limits a number of direct connections for the first device,
      use inquiry packets to alert other devices of the presence of the first device, and
      use the scatternet topology to exchange information with the other devices discovered using the inquiry packets; and
   a second device configured to receive data from the first device through a number of hops using the wireless association protocol,
   wherein the first device is further configured to:
      use the inquiry packets to determine that the number of hops between the first device and the second device exceeds a predetermined threshold,
      identify that a direct connection with a third device has a level of activity lower than a threshold level,
      disconnect the direct connection between the first device and the third device, and
      create a direct connection between the first device and the second device.

2. The system of claim 1, wherein the first device is further configured to use the inquiry packets to determine that the second device is in communication range with the first device.

3. The system of claim 1, wherein the first device is further configured to receive a list of direct connections of at least the second device.

4. The system of claim 1, where the first device is further configured to receive a plurality of lists of active connections from a plurality of devices.

5. The system of claim 4, wherein the first device is further configured to use the plurality of devices to route data between the first device and a fourth device.

6. The system of claim 5, wherein the first device is further configured to transmit an inquiry packet to the fourth device through the second device.

7. The system of claim 6, wherein the second device is further configured to send a confirmation message to the first device that the inquiry packet has been transmitted to the fourth device.

8. The system of claim 6, wherein the first device is configured to disconnect from the third device prior to creating the direct connection with the second device.

9. The system of claim 1, wherein the first device and third device are part of a same piconet prior to the first device disconnecting the direct connection between the first device and the third device.

10. An apparatus in a system of network communications, comprising:
   a first node configured to use inquiry packets to discover nodes within a direct communication range of the first node, create a network topology of connections between the nodes in the system using scatternet packets, communicate with other nodes using a wireless association protocol that limits a number of direct connections for the first node, use the inquiry packets to determine that a number of hops between the first node and a second node exceeds a predetermined threshold, identify that a direct connection with a third node has a level of activity lower than a threshold level, disconnect the direct connection between the first node and the third node, and create a direct connection between the first node and the second node.

11. The apparatus of claim 10, wherein the inquiry packets are used for device discovery.

12. The apparatus of claim 10, wherein the first and third nodes are part of a same piconet prior to the first node disconnecting the direct connection between the first node and the third node.

13. The apparatus of claim 10, wherein the first, second, and third nodes are Bluetooth devices.

14. The apparatus of claim 10, wherein the first, second, and third node each comprises complete topology information about the nodes that they have active connections with.

15. A method of using a scatternet protocol to establish direct routing, comprising:
   determining that a number of hops between a first node and a second node exceeds a predetermined threshold, wherein a number of direct connections for the first node is limited;
   identifying, by the first node, a direct connection with a third node that has a level of activity lower than a threshold level, wherein the direct connection with the third node is one of the number of direct connections currently maintained by the first node;
   disconnecting the direct connection between the first node and the third node; and
   creating a direct connection between the first node and the second node.

16. The method of claim 15, wherein the first node and the second node use a Bluetooth protocol.

17. The method of claim 16, wherein the first node and the second node are connected to at least two other nodes.

18. The method of claim 16, wherein the first and second node exchange network topology information.

19. The method of claim 18, wherein the network topology information comprises at least a fourth node.

20. The method of claim 15, wherein the first node and the second node are not part of a same piconet until the direct connection between the first node and the second node is created.

* * * * *